United States Patent [19]

Thompson et al.

[11] 4,157,316

[45] Jun. 5, 1979

[54] POLYFUNCTIONAL CATALYSTS

[75] Inventors: Charles E. Thompson, Warren; John J. Mooney, Wyckoff; Carl D. Keith, Summit, all of N.J.; William A. Mannion, San Francisco, Calif.

[73] Assignee: Engelhard Minerals & Chemicals Corporation, Iselin, N.J.

[21] Appl. No.: 833,922

[22] Filed: Sep. 16, 1977

Related U.S. Application Data

[63] Continuation-in-part of Ser. No. 608,084, Aug. 27, 1975, abandoned.

[51] Int. Cl.$^2$ .................. B01J 21/04; B01J 23/10; B01J 23/64; B01J 23/74
[52] U.S. Cl. .................. 252/462; 252/466 B; 252/466 PT; 423/213.5
[58] Field of Search .......... 252/462, 466 PT, 466 B; 423/213.5

[56] References Cited

U.S. PATENT DOCUMENTS

| | | | |
|---|---|---|---|
| 3,840,471 | 10/1974 | Acres | 252/466 B |
| 3,939,104 | 2/1976 | Campbell et al. | 252/455 R |
| 3,993,572 | 11/1976 | Hindin et al. | 252/462 |
| 4,006,103 | 2/1977 | Meguerian et al. | 252/466 B |

*Primary Examiner*—W. J. Shine

[57] ABSTRACT

This invention provides polyfunctional catalysts comprising a composite of platinum and one or more of rhodium, ruthenium and iridium, a substantially larger quantity of one or more base metal oxides in which the metal is selected from the group consisting of metals having an atomic number from 25 to 28 and rhenium, and an alumina support, which composite is made and then deposited on a suitable carrier. In a preferred embodiment, the catalysts contain 1–20 weight percent of said base metal oxide, typically nickel oxide; 0.05–0.5 weight percent platinum; and 0.002–0.3 weight percent rhodium, and an alumina support deposited on a monolith or other carrier. The improved catalysts are especially applicable for purifying exhaust gases from combustion processes, and in particular those from internal combustion engines.

These polyfunctional catalysts have in a single formulation, the ability to accomplish four objectives - to oxidize carbon monoxide and unburned hydrocarbons while reducing nitrogen oxides, thereby converting those contaminants found in the exhaust of internal combustion engines into carbon dioxide, water and elemental nitrogen, but without producing significant amounts of hydrogen sulfide, sulfur trioxide or sulfuric acid. Such chemical conversions take place over the catalyst when the ratio of air to fuel supplied to the catalyst is controlled to nearly stoichiometric conditions, thereby maintaining the exhaust feed gases within a narrow compositional range, sometimes called a "window," in which the catalyst can substantially convert the contaminants.

16 Claims, No Drawings

POLYFUNCTIONAL CATALYSTS

This application is a continuation-in-part of application Ser. No. 608,084, filed Aug. 27, 1975, now abandoned.

BACKGROUND OF THE INVENTION

The invention is broadly concerned with improvements in the field of controlling gaseous contaminants from combustion and in particular from the exhaust of internal combustion engines. In particular, polyfunctional catalysts having the ability to convert unburned hydrocarbons, carbon monoxide, and nitrogen oxides to less harmful forms, and a method of operating such catalysts are disclosed.

The problem of substantially converting gaseous contaminants or pollutants in automotive exhaust emissions to less harmful forms has been the subject of much research activity, especially in recent years. There are four principal gaseous components of auto exhaust which are of current interest, namely, unburned hydrocarbons, carbon monoxide, nitrogen oxides, and sulfur oxides. Standards for all these components, except sulfur oxides, have been set by the U.S. Government and which new automobiles already are required to meet. Until recently, adjustments to engine operating conditions have been sufficient to meet the standards. As these standards become increasingly severe, it has been necessary to introduce new methods for removing these contaminants. Most recently, catalysts have been used to oxidize the unburned hydrocarbons and carbon monoxide. In the near future catalysts may be needed to meet more stringent limitations on the nitrogen oxides and sulfur oxides (measured as sulfates and expressed as sulfuric acid) contained in exhaust gases. Removal of nitrogen oxides is accomplished by reducing the oxides to molecular nitrogen. Although sulfur dioxide is produced by the engine combustion process, if the sulfur dioxide is not oxidized to sulfur trioxide or sulfuric acid, then no sulfates are measured. In conventional exhaust catalysts which usually operate under oxidizing conditions, nitrogen oxides are not significantly reduced but sulfur dioxide is oxidized and sulfur trioxide is produced. Improved catalysts and/or revised operating conditions are required to remove all three of the principal contaminants simultaneously without oxidizing the sulfur dioxide present in exhaust gases.

U.S. Pat. No. 3,331,787 discloses a typical precious metal catalyst (platinum and palladium are preferred) which can be used for oxidation of hydrocarbons and carbon monoxide emitted in auto exhaust. Such catalysts are operated with an excess of oxygen present to facilitate the oxidation process. Even should the free oxygen be limited, at least some of the sulfur dioxide present is converted to sulfur trioxide or sulfuric acid. Since removing nitrogen oxides involves the reduction of nitrogen oxides to molecular nitrogen, such reduction is not favored by the conditions which are used to oxidize the hydrocarbons and carbon monoxide to water and carbon dioxide. The two reactions normally require different conditions. For oxidation, an excess of oxygen should be present (fuel-lean), while if nitrogen oxides are to be reduced, it is generally necessary to operate with a deficiency of oxygen (fuel-rich).

Various proposals, as represented by U.S. Pat. Nos. 3,565,574 and 3,741,725, have been made to use two or more catalyst beds in sequence to treat exhaust gases (both catalysts being nickel-based in 3,565,574, and platinum-palladium-metal oxide being used in sequence in 3,741,725). Usually nitrogen oxides are reacted first with the exhaust gas being maintained fuel-rich, followed by injection of air to create a fuel-lean condition suitable for oxidizing of hydrocarbons and carbon monoxide.

A precious metal catalyst (platinum and rhodium) used solely for control of nitrogen oxides is disclosed in U.S. Pat. No. 3,806,582. This catalyst is operated in the presence of an added reducing gas. It is intended that this catalyst be applied to nitric acid plant tail gas, where addition of a reducing gas is feasible. This is less practical during operation of automobiles and a fuel-rich operation would be used instead. However, operating an automobile with an excess of fuel is less economical and produces substantial amounts of unburned hydrocarbons and carbon monoxide, which must be removed by an oxidation catalyst.

In U.S. Pat. No. 3,840,471 a catalyst comprising platinum and rhodium alloyed or mixed with a relatively smaller amount of base metal (nickel in the example given) on an inert support ("Torvex" by E. I. duPont de Nemours & Co. in the example given) is disclosed which will (i) oxidize hydrocarbons and carbon monoxide, or (ii) reduce nitrogen oxides with the addition of a reducing fuel. However, the patent does not disclose the simultaneous removal of all three of these contaminants and suggests that if the catalyst is used to remove all components that sequential operation such as discussed above would be required. Conditions would be adjusted by adding a reducing gas for removal of nitrogen oxide, or alternatively, by adding air for oxidation of hydrocarbons and carbon dioxide.

A previously proposed polyfunctional catalyst, disclosed in U.S. Pat. No. 3,370,914, is capable of removing all three major contaminants simultaneously. A reduced nickel or alumina catalyst promoted by alkali and alkaline earth metals is used to cause the exhaust gases to come to chemical equilibrium. It is shown in the patent that if thermodynamic equilibrium could be achieved, the contaminants would be substantially removed. Such a catalyst will promote the equilibrium of the proposed reactions, but it is believed that this catalyst does not retain this activity for a commercially practical period of time and the amount of catalyst required for automotive use could be excessive for satisfactory emission control.

In summary, it is known in the prior art (1) to use precious metal catalysts for oxidizing carbon monoxide and hydrocarbons (U.S. 3,331,787), (2) to use precious metal catalysts for reducing nitrogen oxide in the presence, of reducing gas (U.S. 3,806,582), (3) to use an alloy or mixture of precious metals and a relatively smaller amount of base metals in a catalyst which can be used for either oxidation or reduction when suitable operating conditions are provided (U.S. Pat. No. 3,840,471), (4) to adjust exhaust gas compositions so that either the oxidation or the reduction is achieved (U.S. Pat. No. 3,565,574 and 3,741,725), and (5) to use a base metal catalyst to promote equilibrium of reactions favorable for removing each of the three principal contaminants in exhaust gases (U.S. Pat. No. 3,370,974).

Another catalyst is disclosed in U.S. Pat. No. 3,883,444, having the capability of reacting all three of the major contaminants simultaneously when stoichiometric amounts of oxygen are present in the exhaust gases. At low space velocities this simultaneous conversion was fairly complete for a short period of time, but similar results were not obtained at higher space velocities. Palladium alone is used in the catalysts in combination with large amounts of cobalt and nickel oxides. However, palladium is sensitive to the sulfur and lead contents of the fuel, and has little ability to retain its activity when operated with an engine operated at essentially stoichiometric conditions, and the use of palladium as the only platinum group metal in the catalyst may not be suitable for use where high levels of conversion of contaminants must be met for extended periods of time.

What has been needed, but not shown in the foregoing prior art, is a catalyst having the ability for a commercially acceptable period to oxidize hydrocarbons and carbon monoxide, without producing significant amounts of sulfur trioxide or sulfuric acid in the exhaust gases or in the atmosphere into which the gases are discharged, while at the same time and with the essentially same operating conditions, to reduce nitrogen oxides without producing significant amounts of hydrogen sulfide, thus avoiding adjusting catalyst operating conditions to produce separate oxidizing and reducing zones. Such a result has been acomplished in the present invention by a novel catalyst which is used in conjunction with an internal combustion engine in which the air-fuel ratio is closely controlled. The catalyst of this invention may also be used in plural catalyst operations, for instance, in conjunction with an oxidation catalyst in separate reaction zones.

SUMMARY OF THE INVENTION

The invention comprises polyfunctional catalysts for substantially reacting contaminants in the exhaust gases from combustion processes generally, and in particular from internal combustion engines, which, when operated under suitably controlled conditions, can simultaneously reduce nitrogen oxides and oxidize hydrocarbons and carbon monoxide, without producing appreciable quantities of hydrogen sulfide, sulfur trioxide or sulfuric acid. These polyfunctional catalysts comprise a platinum group metal component with the addition of a substantially greater quantity of base metal oxides. Such catalysts include as the precious metal component platinum plus one or more of the platinum group metals, rhodium, ruthenium and iridium, including mixtures or alloys thereof. More than two platinum group metals may be present in the catalysts, for instance, the catalysts may also contain palladium, e.g. platinum, palladium and rhodium. In the preferred embodiment, at least platinum and rhodium are used. The base metal oxide may be selected from the group consisting of the oxides of metals having an atomic number from 25 to 28, i.e. cobalt, nickel, iron, and manganese, and rhenium. Such base metal oxides are capable of existing in more than one oxidation state and this ability is believed to underlie the usefulness of such oxides in the polyfunctional catalysts of the invention. Promoters for such changes in oxidation state may be useful additions to the catalysts. The catalysts may also contain other base metal components. In a preferred embodiment nickel oxide is used. While the precious metals are used in small quantities, typically at least about 0.02 e.g. 0.05–0.5, weight percent platinum, and at least about 0.001, e.g. 0.002–0.3, weight percent rhodium, ruthenium or iridium or their combination in a finished catalyst, thus totalling only about 0.021 or more, e.g. 0.052 to 0.8, percent by weight of precious metals, the quantity of base metal oxide is substantially larger, typically comprising 1–20, preferably about 1 to 6, percent by weight of the finished catalyst. The amounts of platinum group metals and base metal oxide employed may depend, for instance, on the type of carrier on which these materials are placed. These active components along with an alumina support are deposited on a formed or macrosize carrier, for example, a monolithic structure such as a ceramic or metal honeycomb or a bed of particulates e.g., small beads or pellets. The channel walls of monoliths typically have a film or coating, sometimes called a wash coat, activated coating, or slip, which provides the large B.E.T. area beneficial as a support for contacting exhaust gases with catalytically active agents. Such coatings, as discussed in U.S. Pat. No. 3,565,830, provide a surface area available for catalyst deposition of about 20 m2/gm or more. The uncoated support may often have a surface area of about 0.2 to 2 m2/gm. The coatings consist essentially of alumina and are usually applied as a single material or as mixtures whose additional components are selected from the group consisting of titania, zirconia, silica, magnesia, strontium oxide, calcium oxide, rare earth oxides such as ceria, lanthanum oxide, and mixtures thereof. The coatings will typically comprise between 3 and 25 percent by weight of the finished catalyst, but where metallic supports are used the coating may comprise as little as 0.2 weight percent of the finished catalyst. In a preferred embodiment a mixture of alumina and ceria is used.

Generally, in accordance with the present invention the catalyst is prepared by combining the platinum group metals and the support by impregnating the support with the following compounds in aqueous solution: a compound of platinum and a compound of the base metal; one or more of a compound of rhodium, a compound of ruthenium, and a compound or iridium. The resulting impregnated support is deposited on the carrier by contacting the carrier with an aqueous dispersion of particles of the impreganted support, which is heated sufficiently to provide a composite of the platinum group metal component, the base metal oxide component and the support on the carrier.

The catalysts of the present invention can be made by depositing an aqueous composite or slip of the platinum group metal component, the base metal component and an alumina support on a monolith or other carrier. Such procedure is not only practical and economic from the commercial standpoint, but the resulting catalysts exhibit outstanding performance characteristics. The platinum group metal component-base metal component-alumina support slip can be prepared in a variety of ways, including the deposition of the base metal component on the alumina support component followed by deposition of the platinum group metal component on the alumina support component. This order of adding the base metal and platinum group metal components may be reversed, or the platinum group metal and base metal components may be simultaneously contacted with the alumina support component and deposited thereon. Various methods of depositing precious metals are described in U.S. Pat. Nos. 3,331,787 and 3,565,830.

In exemplary procedures for making the catalysts of the invention an aqueous solution of a base metal component, e.g. nickel nitrate, can be mixed with powdered alumina support component and the material dried to remove water. Further heating of the composite, say at calcination temperatures, may then be employed to convert the base metal component to an oxide form deposited on the alumina support. This metal component is thereby fixed, i.e., placed in water-insoluble form, on the alumina support. The resulting material can be mixed with the platinum group metal component, e.g. in aqueous form, and the composite may be treated to fix the platinum group metals on the support. Fixing may be done in a variety of ways such as by treatment with a gas such as hydrogen sulfide, or a liquid, such as acetic acid, and/or by reaction of the platinum group metal components, e.g. a basic platinum compound and an acidic rhodium compound. The latter fixing operation can be facilitated by adding an acidic component, e.g. glacial acetic acid, to the material undergoing treatment. The composite of the platinum group metal component, base metal component and alumina support can be comminuted, i.e. reduced in particle size, as by ball-milling. The mixture of catalytically promoting components and alumina support is deposited on the macrosize carrier and the composition is dried, and, if desired, calcined at high temperatures, typically about 500° to 800° C., to yield of polyfunctional catalyst. The calcination may be conducted in air.

The catalysts of the present invention are preferably manufactured in accordance with the foregoing procedures by combining a finely-divided, high surface area, alumina support component with one or more aqueous solutions of the catalytically-promoting metal components, and thereby providing a composite which has essentially all of the liquid absorbed by the solids. The catalytically-promoting metal components of the solid, finely-divided composite are converted into an essentially water-insoluble form, i.e. fixed, after each or all of these components are mixed with the alumina support component. This process can be accomplished by employing an alumina support component which is sufficiently dry to absorb essentially all of the catalytically-promoting metal components, and the catalytically-promoting metal components can then be fixed. During fixing the composite preferably remains essentially dry, i.e., it has essentially no unabsorbed liquid present. The composite containing the fixed, catalytically promoting metal components may then be comminuted as a slurry, and the resulting slurry used to coat the carrier. The composite is dried and may be calcined.

The polyfunctional catalysts of the invention when contacting exhaust gases produced by a combustion process and when operated with the air-fuel ratio in contact with the catalysts controlled close to the stoichiometric ratio, are capable of substantially converting all three major contaminants without producing significant amounts of hydrogen sulfide, sulfur trioxide or sulfuric acid. The air-fuel ratio is adjusted to produce neither a substantially fuel-rich nor a substantially fuel-lean condition in the exhaust gases taken on an average basis. Such a control system will ordinarily result in small fluctuations within narrow limits about the desired air-fuel ratio although there may be short periods of operation outside of the desired range. Operating within these narrow limits, termed a "window", the exhaust gases after treatment will have no more than a small amount of free oxygen. With such exhaust gases the polyfunctional catalysts of the invention will reduce nitrogen oxides and at the same time oxidize carbon monoxide and hydrocarbons when used to treat automotive engine exhaust gases with the air-fuel ratio in contact with the catalyst controlled near stoichiometric conditions. Thus the catalysts of the invention make it possible to meet the stringent exhaust emission standards which may be set in the near future.

DESCRIPTION OF THE PREFERRED EMBODIMENTS

While the following description presents the catalysts and methods of the invention in connection with an important application, namely to automotive use, it will be recognized by those skilled in the art that the invention has broader applications to other combustion processes where similar problems exist.

Catalysts

A polyfunctional catalyst according to the invention comprises a plurality of platinum group metals which retain a high level of effectiveness for commercially useful periods of time by the addition of a substantially greater quantity of base metal oxide. The platinum group catalyst component contains platinum and one or more of rhodium, ruthenium or iridium, preferably at least rhodium. The catalysts may contain more than two platinum group metals. Preferably platinum and rhodium are used, although other combinations of platinum group metals may be used, e.g., platinum, palladium and rhodium. The amount of platinum in the catalysts may generally be more than the total of other platinum group metals present. Catalysts of the best activity, and whose performance characteristics have less dependence on the presence of the base metal oxide component, contain a weight ratio of platinum to total rhodium, ruthenium and iridium of about 2 to 5:1, and as this ratio increases the importance of the base metal oxide component increases. Due to the cost and limited availability of rhodium, ruthenium and iridium, this ratio is often about 8 to 30:1. The ratio of platinum to rhodium in a preferred embodiment is approximately 95/5 Pt/Rh. Since this ratio is approximately that in which platinum and rhodium are found in South African ore, there are commercial advantages to using a 95/5 ratio. The ore or mine ratio of Pt/Rh/Ir is approximately 19/1/0.2 and this ratio of metals may advantageously be employed. It may be desirable however to increase the amount of rhodium present by a factor of about 2 and for instance with a ratio of about 20 Pt/2 Rh/0.3 Ir. However, compositions varying from these ratios are effective and ratios of 95/5 to 50/50 Pt/Rh, Ru and Ir may often be employed. In a preferred embodiment, utilizing Pt/Rh on a monolithic support having the alumina wash coat, the platinum content would be within the range of 0.05 to 0.5 weight percent of the finished catalyst, and the total rhodium, ruthenium and iridium content would be within the range of 0.002 and 0.3 weight percent of the finished catalyst, for a total precious metal content between 0.052 and 0.8 weight percent. The amounts of precious metals given above are stated in ranges related to their effectiveness and the cost of the finished catalyst used with engines. Catalysts having precious metal contents outside the preferred range are effective, even though not preferred for practical reasons. It should be understood that the optimum precious metal loading for particular applications will vary somewhat among the various types of supports, which have different bulk densities and surface areas. Thus, the concentration of the precious metals may be varied to suit the support used, while attempting to achieve the same result. However, the total amount of precious metals used may be related to the piston displacement of the engine and the weight of the automobile rather than the type of support used.

The quantity of base metal oxide used is in general substantially greater than that of the precious metal. In general, the weight ratio of base metal oxide to precious metal will be at least 2 to 1. In one preferred embodiment the base metal oxide content is about eight times that of the precious metal. Typically the base metal oxide is 1–20 percent by weight of the finished catalyst. The base metal oxide may be selected from the group of oxides of metals having an atomic number from 25 to 28 and rhenium, i.e. the iron group metals (nickel, cobalt and iron), manganese and rhenium. Such metal oxides can exist in multiple oxidation states and this characteristic is believed to be useful in the catalysts of the invention. In a preferred embodiment nickel oxide can be used. The base metal oxide component may be a mixture of oxides such as those of cobalt and manganese, with or without nickel oxide, cobalt and nickel, manganese and nickel or the like. Promoters for changes in the oxidation state of metals may be useful additions to the catalyst.

Alumina coatings which provide a large surface area for the catalytic components therein are typically applied to those carriers which have a relatively low surface area, particularly monoliths. Reference can be made for more details to U.S. Pat. No. 3,565,830. Where used with monoliths, the surface area available for catalyst deposition can be increased from a total surface area of say 0.2 to 2 m$^2$/gm for the uncoated support to about 20 m$^2$/gm or more. Such coatings are composed essentially of alumina and may be applied in combination with compounds selected from the group consisting of titania, zirconia, silica, magnesia, calcium oxide, strontium oxide, rare earth oxides e.g., ceria and lanthanum oxide, and mixtures thereof. The coatings will typically be present in the range of 3 to 25 percent by weight of the finished catalyst where a refractory oxide monolith is used, but may comprise as low as 0.2 weight percent where the support is a metallic structure.

Embodiments of suitable preparations for formulating polyfunctional catalysts of the invention are illustrated in the following Examples.

EXAMPLE I

Pre-impregnation of Wash Coat—With Sulfiding

Five hundred (500) grams of a powdered mixture of 90% alumina and 10% ceria by weight is impregnated by mixing it in a mechanical mixer with 195 grams of nickel nitrate hexahydrate which has been dissolved in just enough water to completely saturate the powder. Then, the wet powder is dried and calcined for two hours at 650° C. Three hundred grams of the calcined powder is then impregnated with 160 milliliters of an aqueous solution containing 10.3 grams of chloroplatinic acid and 0.595 grams of rhodium chloride. The wet powder is placed in a chamber, evacuated, and treated with hydrogen sulfide at room temperature to fix the precious metals in place. Thereafter, the sulfided powder is washed with deionized water to free it of chlorides, dried at 125° C., and calcined at 500° C. for two hours. The resulting powder is then ballmilled for 19 hours along with 400 milliliters of deionized water and six milliliters of 15 N nitric acid to reduce the particle size. A monolithic support of cordierite-mullite made by the Technical Ceramics Products Division of the 3M Company (AlSi Mag 795) is then dipped into the milled slurry to coat it with the pre-impregnated slurry to a concentration of 2 grams/in$^3$. Excess slurry is blown off by compressed air and the support is dried at 125° C. to remove free water and calcined at 500° C. to yield a finished polyfunctional catalyst having the composition 0.275 weight percent Pt, 0.0145 weight percent Rh, and 2.0 weight percent Ni$_2$O$_3$. Another catalyst having the composition 0.2 weight percent platinum, 0.005 weight percent palladium, 0.005 weight percent rhodium and 2.25 weight percent Ni$_2$O$_3$ can be similarly made by including in the preparation corresponding amounts of platinum, rhodium and palladium chlorides and nickel nitrate hexahydrate.

EXAMPLE II

Pre-impregnation of Wash Coat—Without Sulfiding

Three thousand (3000) grams of a powdered mixture of 90% alumina and 10% ceria by weight is impregnated with an ammoniacal solution containing 884 grams of nickel formate in just enough water to completely saturate the powder. Then, the wet powder is dried and calcined for 2 hours at 650° C. The calcined powder is then impregnated with an aqueous-amine solution containing 43.4 grams of platinum as H$_2$Pt(OH)$_6$, followed by an aqueous solution containing 14.4 grams of rhodium as rhodium nitrate, the precious metal solutions containing insufficient water to completely saturate the powder, and finally 360 milliliters of glacial acetic acid which fixes the platinum. The resulting slurry is stirred for 30 minutes and sufficient deionized water added to reduce the solids content to 46%. The slurry is then ballmilled for 19 hours to reduce the particle size. A monolithic support of cordierite-mullite of the same type used in Example I is then dipped into the milled slurry to coat it with the pre-impregnated slurry to a concentration of 2 grams/in$^3$. Excess slurry is blown off by compressed air and the support is dried at 125° C. to remove free water and calcined at 500° C. to yield a finished polyfunctional catalyst having the composition 0.217 weight percent Pt, 0.072 weight percent Rh, and 2.0 weight percent Ni$_2$O$_3$.

EXAMPLE III

Pre-impregnation of Wash Coat—Mixed Base Metal

Two thousand one hundred (2,100) grams of a powdered mixture of 90% alumina, 10% ceria by weight is impregnated with an aqueous solution containing 932 grams of cobalt nitrate hexahydrate and 1,200 grams of a 50% aqueous solution of manganese nitrate which contains just enough water to completely saturate the powder. The mixture is dried and calcined for 2 hours at 650° C. The calcined powder is then impregnated with an aqueous amine solution, containing 25.48 grams of platinum as a hydrate platinum (IV) oxide and 2.32 grams of rhodium as rhodium nitrate. The precious metal solutions contain insufficient water to completely saturate the powder. Then 240 milliliters of glacial acetic acid is added which fixes the platinum. Water is added to form a slurry containing 49 percent solids and the slurry is ballmilled for 19 hours to reduce the particle size. A monolithic cordierite support is then dipped into the slurry to coat it with the pre-impregnated slurry to a concentration of 2.17 g/in$^3$ after drying and calcining at 500° C. The finished polyfunctional catalyst has a composition of 0.167 weight percent platinum, 0.015 weight percent rhodium, 1.57 weight percent cobalt oxide and 1.57 weight percent manganese oxide.

Operation of the Catalysts

A polyfunctional catalyst according to the invention is capable of reducing nitrogen oxides and at the same time oxidizing hydrocarbon and carbon monoxide. The ratio of the amounts of air and fuel supplied to the catalyst affects the amounts of contaminants produced. In order to measure catalyst performance with precision an exhaust gas mixture corresponding to a given air-fuel ratio was formulated to include all the major components expected in such exhaust gas mixtures. These mixtures were contacted with the catalysts and the percentage conversion measured. An air-fuel ratio of 14.65 (wt. basis) is the stoichiometric ratio corresponding to the combustion of a hydrocarbon fuel with an average formula $CH_{1.88}$. Fuels with different carbon/hydrogen ratios will require slightly different air-fuel ratios to produce a stoichiometric mixture. To avoid confusion in making comparisons, the Greek symbol $\lambda$ has been used at times to represent the relationship of a particular air-fuel ratio to the stoichiometric ratio. The air-fuel ratio is divided by the stoichiometric ratio so that in this system $\lambda = 1$ is a stoichiometric mixture, $\lambda > 1$ is a fuel-lean mixture and $\lambda < 1$ is a fuel-rich mixture. For example, at an air-fuel ratio of 14.5, the $\lambda = 14.5/14.65 = 0.9898$.

Conversion is substantially complete with fresh catalysts of the invention, usually 90–100% of each contaminant may be removed by the polyfunctional catalysts when operated within narrow limits near the stoichiometric air-fuel ratio. If the fuel-rich condition (below 14.65 or $\lambda < 1$) is used, nitrogen oxides are reduced more favorably, and if a fuel-lean conditon (above 14.65 or $\lambda > 1$) is used, carbon monoxide and hydrocarbons and oxidized more favorably. Although the catalysts could be operated to remove only one type of contaminant from exhaust gases, it is a distinctive feature of the catalysts of this invention that they can convert all three contaminants to harmless compounds when operating in a narrow range of air-fuel ratios or "windows," close to the stoichiometric air-fuel ratio, without producing significant amounts of hydrogen sulfide, sulfur trioxide or sulfuric acid and from the sulfur in the fuels used in operating engines which are the source of the exhaust gases. Bounds for such windows are established in general by air-fuel ratios where conversion of one or more of the contaminants reaches only a minor value. All of the contaminants can be substantially removed if the air-fuel ratio is closely controlled within a "window" having boundaries of about 14.4 and 14.6, although it may be feasible to operate in the range of 14.2 to 14.9 depending to a large extent upon such factors as fuel composition. It is feasible to control the variations in air-fuel ratio within hese average limits. For example, the fuel supply system can be controlled by an oxygen sensor located in the exhaust gases. The normal variations of such a control system provide a continuous swinging of air-fuel ratio about the desired value, near the stoichiometric value. The variations are small, however, and the average air-fuel ratio generally remains within the operating window, and short excursions outside the window may not unduly adversely affect the operations. Under such conditions, it has been found that the catalysts can remove substantially all of the three contaminants. Should a significant excursion outside the operating window occur, the catalyst will be capable of converting more favorably whichever of the contaminants the conditions favor, that is, either nitrogen oxides when the air-fuel ratio is fuel-rich ($\lambda < 1$) or the carbon monoxide and hydrocarbons when the air-fuel ratio is fuel-lean ($\lambda < 1$).

Another benefit of operating a polyfunctional catalyst of the invention with the air-fuel ratio controlled close to the stoichiometric value is that essentially no hydrogen sulfide sulfur trioxide or sulfuric acid may be produced by oxidation of sulfur dioxide present in the exhaust gases. A vehicle so equipped can be expected to meet government standards for sulfate emissions which may be established since such emissions are related to the amount of sulfur dioxide oxidation which occurs.

It should be noted that although one hundred percent conversion is a desirable goal, it is not required. The governmental standards for the maximum allowed exhaust gas emissions are expressed as grams per mile a vehicle travels. If the raw exhaust gases leaving an engine's exhaust manifold contain a high concentration of contaminants, a large percentage conversion of those contaminants will be required. On the other hand, if the contaminants in the raw exhaust gases are already at low concentrations, then only a moderate percentage conversion will be needed to meet the standards.

The polyfunctional catalysts of the invention promote extremely high conversions of all three principal contaminants within the range averaging 14.4 to 14.6 or slightly higher air/fuel ratio. The air/fuel range, "window," for the catalysts of the invention is rather narrow, requiring close control of the air/fuel ratio. The target operating point would appear to be on the fuel-rich side of stoichiometric conditions, that is, $\lambda < 1$. No single steady state conditions can be chosen which will provide the best possible conversion of all the contaminants. It will be appreciated, however, that normal variation in air/fuel ratio in an oxygen sensor controlled engine will be approximately $\pm 0.1$, or $\pm 0.3$, air/fuel units (average weight basis) or less, except for short excursions outside these ranges. Under such conditions the air/fuel ratio is constantly charging and, owing to mixing of gases and the residence time in the exhaust system, the average air/fuel ratio may be at about the midpoint of the window.

It should be noted that since the catalysts have been found to be active for both oxidation and reduction, it is within the scope of the invention to use the catalysts in two stages operating sequentially, such as has been disclosed in the prior art. For example, reducing conditions would be established (an air/fuel ratio $\lambda < 1$ by, for instance, adding a fuel component to have slightly reducing conditions) for reducing nitrogen oxides, then followed by creation of an oxidizing condition by injection of air for oxidizing hydrocarbons and carboon monoxide. Alternatively, the reducing and oxidizing stages could be reversed. While such a sequential operation is not the preferred embodiment, it is a feasible method of utilizing the present catalysts if, for example, precise air/fuel ratio control is not available. A limitation on the application of some of the polyfunctional catalysts of the invention in this manner is the possible formation of ammonia in the first stage which is oxidized to nitrogen oxides in the second stage. In such applications, catalyst compositions should be chosen to minimize ammonia formation under reducing conditions.

Closely controlling air/fuel ratios near $\lambda = 1$ has been found to be a precise operating condition. Prior art catalysts which have good resistance to poisoning when operated as oxidizing catalysts ($\lambda > 1$) rapidly lose activity when essentially no oxygen is present in the exhaust gases. The catalysts of the present invention, however, have a substantial ability to retain adequate performance during use. The conversion of carbon monoxide and nitrogen oxides may not be significantly changed during substantial use. Although the catalysts may lose some of their effectiveness for hydrocarbon removal, they remain satisfactory. The significance of such results is that conversion of each of the principal contaminants of about 70% is needed to meet governmental standards for automotive emissions. The catalysts of the present invention, operating under identical conditions, are a substantial improvement over catalysts previously available.

It should be pointed out that the conditions under which the catalysts of the invention are tested are typical of those found in the average automobile exhaust systems. However, the conditions vary widely, depending on load on the engine. The amount of contaminants also changes substantially as engine conditions vary. Fresh catalysts are substantially more active than "aged catalysts" operating at about 650° C. and 100,000 VHSV (volume hourly space velocity), however, it is the performance of such aged catalysts which indicates their real value for commercial applications. The catalysts may operate at about 400° to 800° C., usually about 450° to 700° C.

A prior art catalyst in which only platinum-rhodium were used as the principal catalytic agents, and thus having no base metal oxide, had good initial activity, but substantially inferior performance when aged. Removal of nitrogen oxides and hydrocarbons never approaches 100%, even under the most favorable conditions outside the operating window. Performance of the catalyst for CO conversion is better but not as good as the catalysts of the present invention.

Another prior art catalyst was tested. This catalyst uses platinum-rhodium and a base metal, the three elements being alloyed to form the catalyst. This catalyst is similar to that disclosed in U.S. Pat. No. 3,840,471 in that only a minor percentage of base metal is used. The catalyst was prepared in a similar manner to the Example in the patent, deleting the separate nickel impregnation, but including nickel nitrate in the precious metal solution. The catalyst contained about 0.1 weight percent Pt, 0.017 weight percent Rh, and 0.029 weight percent Ni. It is believed to be of significance that the base metal is being alloyed by depositing with the precious metal and being reduced to the metallic state rather than being separately deposited and oxidized as in the present invention. The performance of the catalyst of this prior patent is somewhat similar to that of the prior art catalyst mentioned above in which only platinum and rhodium were used as catalysts. However, the position of the window is different for the two catalysts. Removal of nitrogen oxides is better with the alloy catalyst than with the catalyst containing only precious metals as the principal catalytic agents, but the inferior removal of hydrocarbons and carbon monoxide is present again.

Performance of these prior art catalysts after aging, shows serious loss of activity for conversion of nitrogen oxides and hydrocarbons, even under the most favorable conditions. Such results effectively define the catalysts' performance since the conversion of CO is significantly higher. The loss of conversion of nitrogen oxides and hydrocarbons also results in much lower crossover point for these conversions, indicating that these catalysts are inferior for use as polyfunctional catalysts compared to catalysts of the present invention which retain higher activity after the same aging.

When the catalysts of the present invention are used in an automobile, the performance is reported according to U.S. Government standards in grams of each component discharged for each mile traveled over a prescribed sequence of operation. In tests using a four cylinder automobile, after 4,000 miles of air/fuel ratio-controlled operation the catalysts are capable of giving results similar to the following:

| | |
|---|---|
| Hydrocarbons - | 0.22 grams/mile |
| | 0.21 grams/mile |
| Carbon monoxide - | 1.93 grams/mile |
| | 1.41 grams/mile |
| Nitrogen oxides - | 0.87 grams/mile |
| | 0.94 grams/mile |
| Sulfates - | 0.0033 grams/mile |
| | 0.00054 grams/mile |

It should be noted that the quantities of sulfates measured are considered negligible. The quantities of hydrocarbons, carbon monoxide, and nitrogen oxides may be compared with the most stringent Federal standards anticipated for 1978 of 0.41 gram/mile hydrocarbons, 3.4 grams/mile carbon monoxide, and 0.4 gram/mile nitrogen oxides. More recently, it appears that these standards will take effect in 1980, except that the nitrogen oxide emissions will be 2 grams per mile until 1981 at which time the maximum allowable will be 1 gram per mile. The nitrogen oxide emissions in the above tests could be lowered further by decreasing the air-fuel ratio, possibly at the expense of increased hydrocarbon and carbon monoxide concentrations. Alternatively, all emissions could be reduced by increasing the amount of catalyst used.

It is claimed:
1. A catalyst suitable for simultaneously oxidizing gaseous hydrocarbons and carbon monoxide and reducing nitrogen oxides, consisting essentially of
 (a) a support consisting essentially of alumina;
 (b) platinum group metal component, the platinum group metal being selected from the group consisting of platinum plus at least one of rhodium, ruthenium, iridium and mixtures thereof, and alloys of said platinum group metals;
 (c) a base metal oxide component, the base metal being selected from the group consisting of metals having an atomic number from 25 to 28 and rhenium, and mixtures thereof, said base metal oxide being present in a weight ratio of said platinum group metal component of at least 2 to 1 and;
 (d) a carrier on which said support, composited with both said platinum group metal component and said base metal oxide component are deposited;
 (e) said catalyst being prepared by combining said platinum group metal component, said base metal oxide component, and said support by impregnating said support in particulate form with the following compounds in aqueous solution: a compound of said base metal, a compound of platinum; and one or more of a compound of rhodium, a compound of ruthenium, or a compound of iridium; the resulting impregnated support being deposited on said carrier by contacting said carrier with an aqueous dispersion of particles of said impregnated support, and heating said impregnated support at a temperature sufficiently high to provide on said carrier a composite of said platinum group metal component, said base metal oxide component and said support.

2. The catalyst of claim 1 wherein said platinum group metal consists essentially of platinum and rhodium, and optionally, palladium.

3. The catalyst of claim 1 wherein the carrier is monolithic.

4. The catalyst of claim 1 wherein the base metal oxide consists essentially of nickel oxide.

5. The catalyst of claim 4 wherein the platinum group metal consists essentially of platinum and rhodium, and optionally palladium.

6. The catalyst of claim 5 wherein platinum is 0.05 to 0.5 weight percent and rhodium is 0.002 to 0.3 weight percent of the catalyst, the amount of platinum is at least equal to the amount of rhodium, and the nickel oxide is 1 to 20% of the catalyst.

7. The catalyst of claim 6 wherein the carrier is monolithic.

8. The catalyst of claim 7 wherein the support consists essentially of alumina stabilized by ceria.

9. A catalyst suitable for simultaneously oxidizing gaseous hydrocarbons and carbon monoxide and reducing nitrogen oxides, consisting essentially of
(a) a support consisting essentially of alumina:
(b) a platinum group metal component, the platinum group metal being selected from the group consisting of platinum plus at least one of rhodium, ruthenium, iridium, and mixtures and alloys thereof, said platinum group metal component being deposited on said support by mixing said support in particulate form with compounds of said platinum group metals in solution in an aqueous medium, said compounds of said platinum group metals essentially including a compound of platinum and at least one of a compound of rhodium, a compound of ruthenium and a compound of iridium, said support and aqueous medium being present in amounts such that essentially all of said aqueous medium is absorbed by said support, and fixing said platinum group metal on said support;
(c) a base metal oxide component, the base metal being selected from the group consisting of metals having an atomic number from 25 to 28 and rhenium, and mixtures thereof, said base metal oxide component being present in a weight ratio to said platinum group metals of at least 2 to 1 and being deposited on said support by mixing said support in particulate form with an aqueous solution containing a compound of said base metal, said support and aqueous solution being present in amounts such that essentially all of said aqueous solution is absorbed by said support, and fixing said base metal as an oxide on said support;
(d) a carrier on which said support, composited with both said platinum group metal component, and said base metal oxide component are deposited as defined hereinbelow;
(e) said catalyst being made by contacting said carrier with an aqueous dispersion of particles of said impregnated support and heating said impregnated support at a temperature sufficiently high to provide on said carrier a composite of said platinum group metal component, said base metal oxide component and said support.

10. A catalyst of claim 9 in which said fixings of said platinum group metals and said base metal are conducted in the absence of unabsorbed aqueous medium.

11. A catalyst for simultaneously oxidizing gaseous hydrocarbons and carbon monoxide and reducing nitrogen oxides consisting essentially of
(a) a support consisting essentially of alumina;
(b) a platinum group metal component, the platinum group metal being selected from the group consisting of platinum plus rhodium, mixtures and alloys thereof, said platinum group metal component being about 0.05 to 0.8 weight percent of the catalyst and the amount of platinum being at least equal to the amount of rhodium, said platinum group metal component being deposited on said support by mixing said support in particulate form with a compound of platinum and a compound of rhodium in solution in an aqueous medium, said support and aqueous medium being present in amounts such that essentially all of said aqueous medium is absorbed by said support and fixing said platinum group metal on said support in the absence of unabsorbed aqueous medium;
(c) nickel oxide being 1 to 20 weight percent of the catalyst and deposited on said support by mixing said support in particulate form with an aqueous solution containing a compound of nickel, said support and aqueous solution being present in amounts such that essentially all of said aqueous solution is absorbed by said support, and fixing the nickel of said nickel compound as nickel oxide on said support in the absence of unabsorbed aqueous medium; and
(d) a monolithic carrier on which a composite of said support, composited with both said platinum group metal component and said nickel oxide are deposited as defined hereinbelow;
(e) said catalyst being prepared by comminuting said support containing said platinum group metal component and said nickel oxide in an aqueous medium to provide an aqueous slurry, and contacting the resulting slurry with said carrier and heating said slurry at a temperature sufficient by high to provide on said carrier said composite.

12. The catalyst of claim 11 wherein said support consists essentially of alumina stabilized by ceria.

13. The catalyst of claim 1 wherein said support consists essentially of alumina and ceria.

14. The catalyst of claim 1 wherein said impregnated support is heated on said carrier to drive off free water and then is calcined on said carrier.

15. The catalyst of claim 1 wherein the step of impregnating said support with said compounds in aqueous solution is followed by a step of drying and calcining the resulting impregnated support prior to the steps of forming said aqueous dispersion of particles of said impregnated support and contacting said carrier with said aqueous dispersion.

16. The catalyst of claim 15 wherein the base metal oxide consists essentially of nickel oxide, the platinum group metal consists essentially of platinum and rhodium, and optionally palladium, platinum is 0.05 to 0.5 weight percent and rhodium is 0.002 to 0.3 weight percent of the catalyst, the amount of platinum is at least equal to the amount of rhodium, and the nickel oxide is 1 to 20 weight percent of the catalyst.

* * * * *

UNITED STATES PATENT AND TRADEMARK OFFICE
CERTIFICATE OF CORRECTION

PATENT NO. : 4,157,316
DATED : Jun. 5, 1979
INVENTOR(S) : Charles E. Thompson, John J. Mooney, Carl D. Keith and William A. Mannion It is certified that error appears in the above-identified patent and that said Letters Patent are hereby corrected as shown below:

In column 2, line 38 "or" should be --on--.

In column 8, line 55 "hydrate" should be --hydrated--.

In column 9, line 34 "hydrocarbons and" should be --hydrocarbons are--.

In column 9, line 54 "hese" should be --these--.

In column 10, line 3 " < " should be -- > --.

In column 10, line 39 "charging" should be --changing--.

In column 12, claim 1, line 43, insert --a-- between "(b)" and "platinum".

In column 12, claim 1, line 52, "of" should be --to--.

In column 13, claim 9, line 25, "hydroncarbon" should be --hydrocarbon--.

In column 14, claim 11, line 43, "sufficient by" should be --sufficiently--.

Signed and Sealed this

Fifteenth Day of July 1980

[SEAL]

Attest:

SIDNEY A. DIAMOND

Attesting Officer

Commissioner of Patents and Trademarks